United States Patent [19]
Owen

[11] 3,790,147
[45] Feb. 5, 1974

[54] HEIGHT CONTROL VALVE FOR AIR SPRING WITH END PISTON-BOOT OPERATED

[75] Inventor: Robert E. Owen, Grand Blanc, Mich.

[73] Assignee: General Motors Corporation, Detroit, Mich.

[22] Filed: Nov. 17, 1972

[21] Appl. No.: 307,218

[52] U.S. Cl............................................. 267/65 B
[51] Int. Cl.............................................. F16g 5/00
[58] Field of Search.... 267/65 B, 65 A, 65 R, 64 R, 267/64 B

[56] References Cited
UNITED STATES PATENTS
2,916,298   12/1959   McMullin.......................... 267/65 B
3,074,709   1/1963   Ballard et al..................... 267/65 B

*Primary Examiner*—James B. Marbert
*Attorney, Agent, or Firm*—J. C. Evans

[57] ABSTRACT

A height control valve assembly for a vehicle leveling system includes an air spring having a resilient rolling lobe which rolls onto and off of a bell-shaped surface of an air spring piston. A height control valve in the piston is operated by the air spring lobe as it rolls onto and off of the piston to control the amount of air pressure within the air spring.

5 Claims, 4 Drawing Figures

PATENTED FEB 5 1974 3,790,147
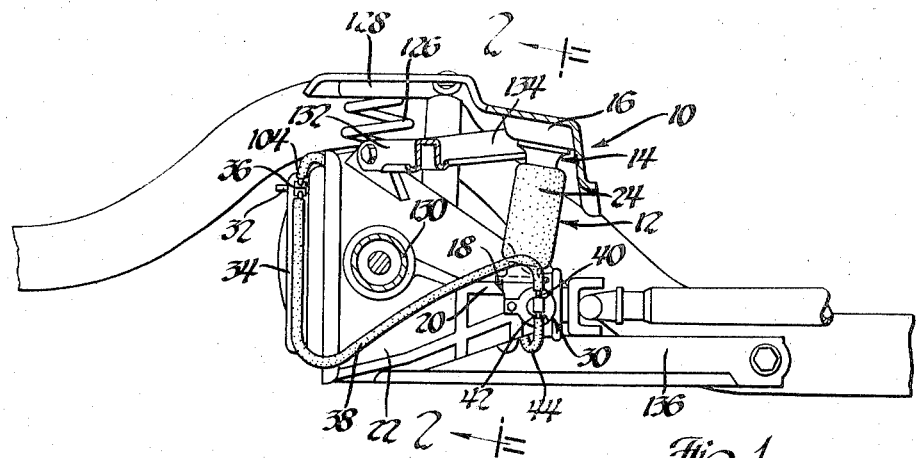
Fig.1
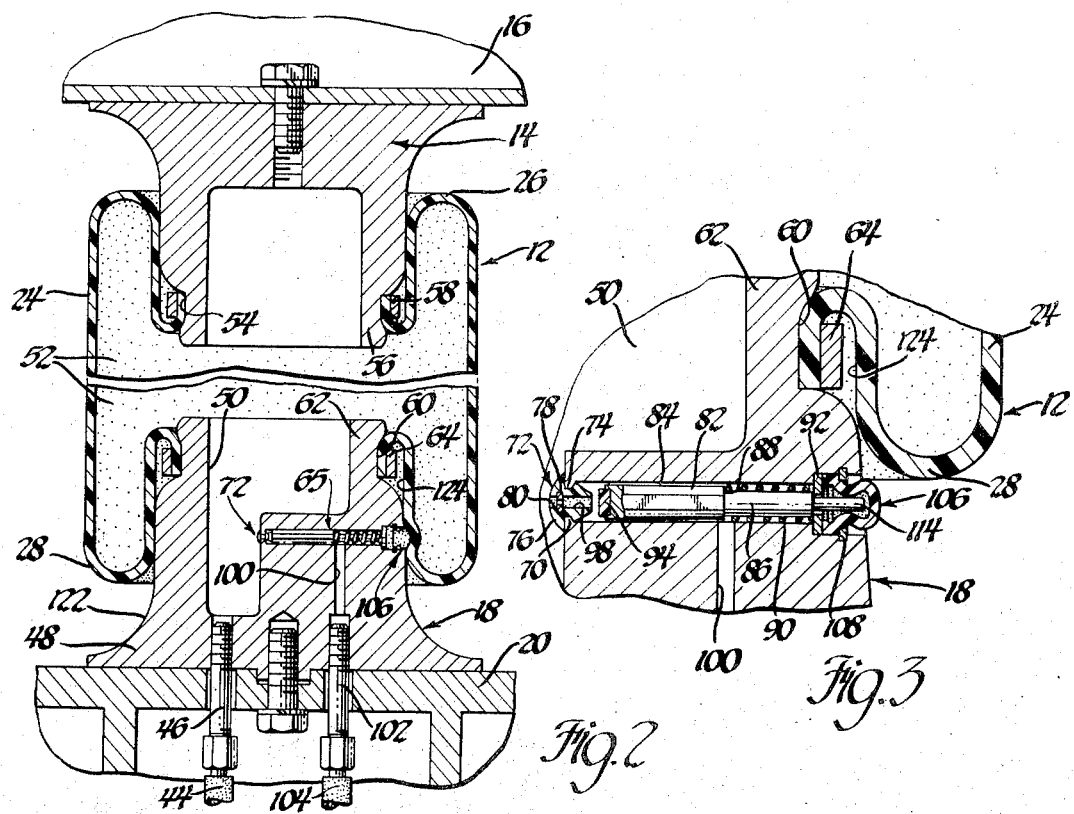
Fig.2
Fig.3
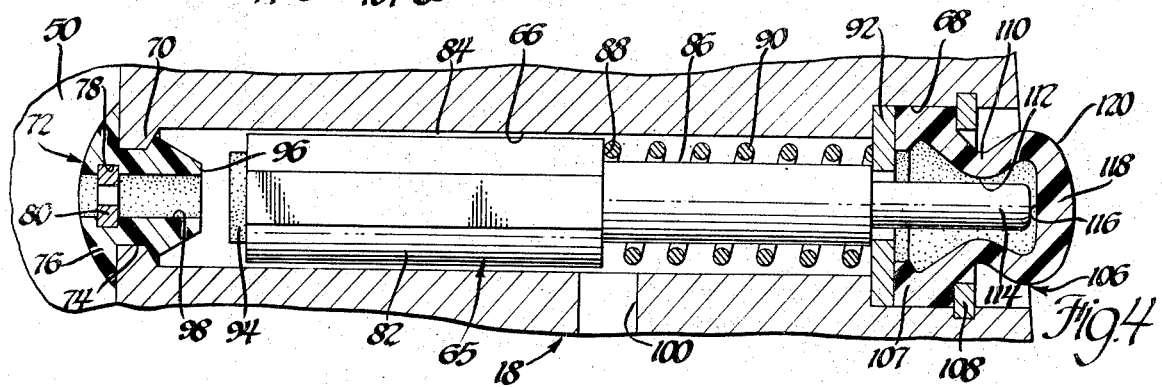
Fig.4

HEIGHT CONTROL VALVE FOR AIR SPRING WITH END PISTON-BOOT OPERATED

This invention relates to height control valve assemblies for vehicle leveling systems and more particularly to height control valves carried on one of a pair of relatively moving members in a vehicle leveling spring unit which is operated by the other relatively moving member to control air pressure within the air spring unit.

Vehicle leveling systems include valve components therein operated in response to changes in load on the vehicle chassis to regulate the air pressure within an air spring leveler unit of the system so as to maintain a predetermined height relationship between the sprung and the unsprung mass of the vehicle.

In some cases, the valve is carried as part of the leveler unit. In the past, the valve has been carried on a portion of the leveler unit and has been operated by another portion of the leveler unit which moves relative to the valve in accordance with changes in the height of the vehicle chassis with respect to unsprung mass portions of a vehicle suspension. In certain arrangements, the valve is located internally of the leveler component. Usually, in these cases a separate lever operator is utilized to control the valve. In other versions, a rolling lobe of an air spring is used to open and close an orifice opening to obtain the valve control at a point external of the leveler unit.

An object of the present invention is to provide a simplified height control valve assembly for use on air springs of the type including an elongated sleeve having a rolling lobe on at least one end thereof which is connected to a piston that, along with the sleeve, forms a pressurizable air chamber for varying the height relationship of the air spring unit and wherein a sealed valve is located within the piston and operated by rolling action of the lobe onto and off of the air piston to regulate pressurization of the air spring.

Still another object of the present invention is to improve the control of pressure within an air spring of the type including a diaphragm having a lobe portion thereon and a piston defining a pressurizable chamber by the provision of valve means carried by the piston and sealed internally thereof and wherein the seal means for the valve is located in operative relationship with the lobe of the diaphragm and operated thereby as the lobe rolls on and off the piston to operate the valve into opened and closed positions for controlling the pressure level in the pressurizable chamber of the leveler unit.

Yet another object of the present invention is to provide an improved height control arrangement for use in air spring assemblies of the type having a lobed diaphragm and a piston for forming a pressurizable air chamber by the provision of a simplified on/off valve assembly supported by the piston internally thereof and a seal for excluding debris from exteriorly of the air unit from the valve assembly with the seal means being formed in part by a bulked end thereon with a curve surface extending slightly beyond the outer surface of the piston, operatively engaged by a curved portion of the lobe of the diaphragm as it moves on and off of the outer surface of the piston to produce axial movement of the seal member which positions the valve in a closed position when the lobe is located on the piston and which positions the valve open when the spring lobe is off the piston.

These and other objects of the present invention are attained in one working version which includes an air spring unit having an elongated sleeve portion having a length in excess of the diameter thereof with lobes formed on each end thereof by tapered ends of the sleeve. Each of the lobes are fastened to a piston having a bell-shaped outer surface configuration. The pistons and sleeve form a pressurizable air chamber. One of the pistons has an inlet recess therein which communicates with a transverse bore formed through the piston through the bell-shaped surface thereon. The bore has a valve seat therein. An elongated stem is located within the bore and supports a valving element on one end thereof which is moved into and out of engagement with the valve seat. A seal member closes the outer end of the bore and is located in overlying relationship to the end of the elongated stem. It includes a curvilinear surface thereon located exteriorly of the piston at a point to be engaged by the lobe of the spring as it moves onto and off of the piston in accordance with distance between the pistons. When a vehicle is slightly loaded, the pistons are moved apart from one another so as to cause the lobe to move off the bell-shaped surface of the piston and away from the seal member allowing the elongated stem to move in a direction to shift the valving element from a sealed relationship with the valve seat. When the vehicle is heavily loaded, the lobe of the sleeve will move onto the bell-shaped surface and will engage the seal element to move the elongated stem to shift the valving element into a closed sealed relationship with the valve seat.

Further objects and advantages of the present invention will be apparent from the following description, reference being had to the accompanying drawings wherein a preferred embodiment of the present invention is clearly shown.

IN THE DRAWINGS:

FIG. 1 is a fragmentary view of a vehicle leveling system including the present invention;

FIG. 2 is an enlarged sectional view through lines 2—2 of FIG. 1 looking in the direction of the arrows; and FIG. 3 is an enlarged fragmentary sectional view of the present invention; and FIG. 4 is a further enlargement of FIG. 3.

Referring now to the drawings, in FIG. 1, a portion of a rear suspension leveling system 10 is illustrated. It includes an air spring assembly 12 having an upper piston 14 thereof connected to a cross frame member 16 on the rear suspension of a vehicle. A lower piston 18 of the air spring assembly 12 is supported by a ledge 20 on a differential housing 22.

The air spring assembly further includes an elongated diaphragm sleeve 24 having a rolling lobe 26 at the upper end and a like rolling lobe 28 at the bottom thereof.

The air spring assembly 12 serves as a load-leveling component in the leveling system 10. It is operatively associated with an air supply system 30 including an air inlet 32 connected to the open end of a dessicant tank 34. Air flows through the dessicant tank to a fitting 36 thereon that connects to one end of a supply conduit 38 having the opposite end thereof connected to a compressor inlet fitting 40. The compressor also has an outlet 42 connected to an inlet end of a pressure conduit 44. The opposite end of pressure conduit 44 is connected to a fitting 46 that is threadably received in a base 48 of the lower piston 18.

The piston 20 includes a stepped bore 50 on the interior thereof which communicates the fitting 46 with a pressurizable air chamber 52 formed by the upper piston 14, the elongated diaphragm sleeve 24 and the lower piston 18. The end of the upper lobe 26 is located within a grooved continuously formed peripheral surface 54 on a small diameter end 56 of the upper piston 14. It is held in sealing engagement thereon by a clamp ring 58. Likewise, the end of the lower lobe 28 is located on a grooved continuously formed peripheral surface 60 formed on the inner end 62 of the lower piston 18. It is held in sealing engagement with the surface 60 by means of a clamp ring 64.

Air flow from the chamber is under the control of an improved height control valve assembly 65 which includes a lateral bore 66 formed through the piston 18 including an outwardly located enlarged diameter portion 68 and an inwardly located shoulder 70 that defines a support for an air spring orifice and seat member 72. More particularly, the member 72 includes a peripheral groove 74 which fits over the shoulder 70 of the piston bore. It has a head portion 76 that overlies the shoulder 70. The head portion has an internal groove 78 in which is seated an orifice plate 80 for regulating the rate of air flow from the pressurizable air chamber 52 into the lateral bore 66. Within the lateral bore 66 is located an elongated valve stem 82 having a hexagonal cross-section defining a peripheral surface spaced from the bore 66 to define a passageway 84 between the stem 82 and the bore 66.

The stem 82 is undercut at 86 to define a spring seat 88 in engagement with one end of a minimum pressure retention spring 90. It has the opposite end thereof supported by a stop element 92 seated on the inner end of the enlarged bore portion 68. The minimum pressure retention spring 90 yields against the buildup of pressure within the chamber 52 above a predetermined minimum pressure that is required to maintain a shape to the lobes 26, 28 of the diaphragm 24 under low load conditions so that they will freely roll on and off of the outer surfaces of the pistons 14, 18. The spring 90 urges a valving element 94 carried on the end of the stem against an annular valve seat surface 96 on member 72 to close a flow passageway 98 through the member 72. Exhaust flow from the valve assembly 64 is through the passageway 84 and an exhaust passageway 100 in piston 18 that intersects the bore 66 outwardly of the seat 96. The exhaust passageway 100 has a tube connector fitting 102 threadably received therein. It in turn is connected to an exhaust line or conduit 104 which is connected to a fitting 36 on the dessicant tank 34.

One feature of the present invention is that the working components of the valve are located completely within the body of the piston 18. The internal location is sealed by means of a boot member 106 which has an annular inner end 107 thereon seated within the large diameter portion 68 against the stop 92. The boot end 107 is secured in place by means of a retaining washer 108. Member 106 further includes an inwardly formed midportion 110 having an annular internal surface 112 located in close surrounding relationship with an outward extension 114 of the stem 82 which is located within the large diameter bore 68. The terminus of extension 114 is spaced with respect to an inner surface 116 of a spherical bulbed end portion 118 that has a curved outer surface 120 located slightly outwardly of the outer surface of the piston 18. In the illustrated arrangement the piston 18 has a bell-shaped curved outer surface 122 onto which the lower lobe 28 of the air spring diaphragm 24 rolls on and off during vehicle leveling operations.

When in the position shown in FIG. 2, an inner wall 124 of the lobe 28 overlies the bulbed end 118 of the boot and the midportion 110 of the boot yields axially to cause the inner surface 116 of the boot 106 to engage the extension 114 to shift the valve stem 82 so as to sealingly press the valving element 94 against the seat 96 so as to hold substantial pressures within the air chamber 52.

The boot 114 in addition to transferring the action of the rolling lobe 28 against the stem serves to completely seal the internally located valve components against dust, moisture and other debris typically found outside of an air spring unit of the type illustrated. The condition shown in FIG. 2 is caused when additional load is placed on the vehicle chassis. This will cause a pair of rear, primary suspension springs to be compressed. One of the springs is shown at 126 in FIG. 1. As in the case of both of the springs, it has the upper end thereof carried on a spring seat 128 at the rear side of the cross member 16. The lower end thereof is supported on a bracket (not shown) supported by an axle housing 130. The movement between the chassis and the axle housing 130 is controlled by a pair of upper control arms 132, 134 of a conventional type. Additionally, the suspension includes a pair of lower control arms, one of which is shown at 136. These components are conventional components found on four link type rear suspensions and form no part of the present invention.

When load is removed from the vehicle chassis, the springs will move the chassis frame away from the axle housing 130. This will cause the pistons 16 and 18 to be separated from one another until the lower lobe 28 moves off of the bell-shaped surface 122. The unit then assumes the operative relationship in FIG. 3 with the boot 106 extending from the midpoint 110 thereof to locate the inner surface 116 of the bulbed end 118 away from the stem extension 114. At this point, only the force of the minimum pressure retention spring acts on the stem 84. Accordingly, pressure within the pressurizable chamber 52 presses against the valving element 94 causing it to move to the open position shown in FIG. 3 and air is exhausted from the bore 50 through the exhaust passageway 100 thence through the exhaust conduit 104 and the dessicant tank 34 thence through the fitting 32 to atmosphere.

The aforedescribed valving assembly 65 in addition to being internally located and sealed against outside influences is readily replaced from exteriorly of the leveler unit 12.

In the illustrated arrangement, it controls the height relationship between the sprung and unsprung mass portion to within one-fourth of the distance which is established as a normal predetermined height relationship therebetween.

It is operative to control pressures from a minimum pressure level of 10 psig when the valve is in the open position with only the minimum pressure retention valve operative to a pressure of 60 psig when the valve is closed as shown in FIG. 2.

While the embodiments of the present invention, as herein disclosed, constitute a preferred form, it is to be understood that other forms might be adopted.

What is claimed is as follows:

1. A control valve assembly for a vehicle leveling system comprising an air spring piston having a base portion adapted to be connected to a first suspension component, said piston including an inner end portion thereof of a first diameter, an outer surface on said piston including a reduced diameter at one end thereof and a progressively increasing diameter at the opposite end thereof, a tubular air spring sleeve including a rolling lobe portion, an end on said rolling lobe overlying said small diameter end of said outer piston, means for holding said lobe end portion in sealing engagement with said piston, said rolling lobe including an inner wall portion movable onto and from said outer surface of said piston, means including said sleeve and said piston for forming a pressurizable air chamber for varying the pressurization of said air sleeve to produce a reaction against said piston member to produce a supplemental spring force, a bore extending through said piston from said outer surface thereof into said pressurizable chamber, a valve seat formed in alignment with said bore, a valve stem having a valving element thereon located in alignment with said seat adapted to be moved into opened and closed relationship with said seat, said stem including a plunger on one end thereof directed outwardly of said bore, means forming an outlet passageway in communication with said bore adapted to be connected to a fluid supply system for said air spring, a seal boot supported by said piston having an inner surface thereon in engagement with said plunger and including an outer surface portion thereon extending outwardly of said piston at the small diameter end of said outer piston surface, said rolling lobe of said air sleeve having an inner wall portion thereon movable onto and off of said outer piston surface engageable with said outer surface of said boot to exert an inward pressure on said stem so as to maintain said valving element tightly closed against said valve seat to trap air within said air chamber to increase the air pressure therein, said air spring sleeve responding to a reduction of vehicle load thereon to cause the inner wall of said rolling lobe to roll off said outer piston surface and away from said outer boot surface to reduce the inward exertion of pressure on said valving element, said valving element responding to a predetermined pressure thereon when said rolling lobe is no longer pressed against said boot to cause said valve stem to move away from said valve seat to leak air from said air chamber through said outlet passageway.

2. A control valve assembly for a vehicle leveling system comprising an air spring piston having a base portion adapted to be connected to a first suspension component, said piston including an inner end portion thereof of a first diameter, a bell-shaped outer surface on said piston including a reduced diameter at one end thereof and a progressively increasing diameter at the opposite end thereof, a tubular air spring sleeve including a rolling lobe portion, an end on said rolling lobe overlying said small diameter end of said outer piston, means for holding said lobe end portion in sealing engagement with said piston, said rolling lobe including an inner wall portion movable onto and from said bell-shaped surface of said piston, means including said sleeve and said piston for forming a pressurizable air chamber for varying the pressurization of said air sleeve to produce a reaction against said piston member to produce a supplemental spring force, a bore extending through said piston from said bell-shaped outer surface thereof into said pressurizable chamber, a valve seat formed in alignment with said bore, a valve stem having a valving element thereon located in alignment with said seat adapted to be moved into opened and closed relationship with said seat, means including a minimum pressure retention spring biasing said stem to move said sealing element into a closed position against said seat, said stem including a plunger on one end thereof directed outwardly of said bore, an outlet passageway in said bore adapted to be connected to a fluid supply system for said air spring, a seal boot supported by said piston having an inner surface thereon in engagement with said plunger and including an outer surface portion thereon extending outwardly of said piston at the small diameter end of said bell-shaped outer surface, said rolling lobe of said air sleeve having an inner wall portion thereon movable onto and off of said bell-shaped surface engageable with said outer surface of said boot for supplementing the spring bias of said minimum pressure retention spring to exert an inward pressure on said stem so as to maintain said valving element tightly closed against said valve seat to trap air within said air chamber to increase the air pressure therein, said air spring sleeve responding to a reduction of vehicle load thereon to cause the inner wall of said rolling lobe to roll off said outer bell-shaped surface and away from said outer boot surface to reduce the pressure on said valving element, said valving element responding to a predetermined pressure thereon when said rolling lobe is no longer against said boot to overcome said minimum pressure retention spring and to cause said valve stem to move away from said valve seat to leak air from said air chamber through said exhaust passageway in said air spring piston.

3. An air spring assembly comprising a tubular air spring sleeve, means for closing one end of said tubular air spring sleeve, a rolling lobe on the other end of said sleeve, said rolling lobe including an inner wall and an end portion thereon, a piston having a small diameter inner end thereon located within the end of said rolling lobe, means for sealing said piston and sleeve ends together, an outer surface on said piston having a smaller diameter adjacent said small diameter end of said piston and a progressively increasing diameter, said rolling lobe including an inner wall movable onto and off of said outer piston surface and a curved portion, said piston and said sleeve forming a pressurizable air chamber adapted to be inflated to vary the reaction on said piston for producing a resultant force between the ends of said tubular sleeve, said piston including a bore therethrough extending from said outer piston surface and into said pressurizable air chamber, an elongated valve stem located within said bore, a valving element carried on one end of said stem, means defining a valve seat in said bore in alignment with said valving element, means forming an exhaust passageway in communication with said bore, a boot including a base portion located within said bore, means for holding said boot end in sealing engagement with said bore, said boot including an inwardly pinched midportion thereon and a bulbed end having an inner surface engageable with the outermost end of said valve stem and an outer surface with curved segments thereon located outwardly of said piston beyond said outer surface thereon, said outer surface curved segments being engageable with the curved portion of said rolling lobe of said sleeve as said sleeve lobe passes onto and off of said piston to move said boot inwardly of said valve bore, said inner surface of said boot engaging said valve stem when said rolling lobe is in contact therewith to move it inwardly of said bore to cause said valving element to move into sealed engagement with said valve seat, said inwardly directed midportion of said boot located in close spaced relationship to said stem and movable with respect thereto upon valve closing movement of said stem to guide said stem linearly of said valve stem bore during valve closing and opening movements, said stem being moved away from said seat by pressure on said valving element when said lobe is out of engagement with said bulbed end to cause air to leak from said sleeve into said exhaust passageway means.

4. An air spring assembly comprising a tubular air spring sleeve, means for closing one end of said tubular air spring sleeve, a rolling lobe on the other end of said sleeve, said rolling lobe including an inner wall and an end portion thereon, a piston having a small diameter inner end thereon located within the end of said rolling lobe, means for sealing said piston and sleeve ends together, an outer surface on said piston having a smaller diameter adjacent said small diameter end of said piston and a progressively increasing diameter, said rolling lobe including an inner wall movable onto and off of said outer piston surface and a curved portion, said piston and said sleeve forming a pressurizable air chamber adapted to be inflated to vary the reaction on said piston for producing a resultant force between the ends of said tubular sleeve, said piston including a bore therethrough extending from said outer piston surface and into said pressurizable air chamber, an elongated valve stem located within said bore having the walls thereof spaced from said wall to form an axial opening therebetween, a valving element carried on one end of said stem, means defining a valve seat in said bore in alignment with said valving element, minimum pressure retention spring means acting on said stem for holding said valving element against said seat to trap a predetermined minimum pressure within said air chamber, means forming an exhaust passageway in communication with said axial passageway, a boot including a base portion located within said bore, means for holding said boot end in sealing engagement with said bore, said boot including an inwardly pinched midportion thereon and a bulbed end having an inner surface engageable with the outermost end of said valve stem and an outer surface with curved segments thereon located outwardly of said piston beyond said outer surface thereon, said outer surface curved segments being engageable with a curved portion of said rolling lobe of said sleeve as said sleeve lobe passes onto and off of said piston surface to move said boot inwardly of said valve bore, said inner surface of said boot engaging said valve stem when said rolling lobe is in contact therewith to move it inwardly of said bore to cause said valving element to move into sealed engagement with said valve seat, said inwardly directed midportion of said boot located in close spaced relationship to said stem and movable with respect thereto upon valve closing movement of said stem to guide said stem linearly of said valve stem bore during valve closing and opening movements, said stem being moved away from said seat by pressure on said valving element when said lobe is out of engagement with said bulbed end to cause air to leak from said sleeve into said exhaust passageway means.

5. An air spring assembly comprising a tubular air spring sleeve, means for closing one end of said tubular air spring sleeve, a rolling lobe on the other end of said sleeve, said rolling lobe including an inner wall and an end portion thereon, a piston having a small diameter inner end thereon located within the end of said rolling lobe, means for sealing said piston and sleeve ends together, an outer surface on said piston having a smaller diameter adjacent said small diameter end of said piston and a progressively increasing diameter, said rolling lobe including an inner wall movable onto and off of said outer piston surface and a curved portion, said piston and said sleeve forming a pressurizable air chamber adapted to be inflated to vary the reaction on said piston for producing a resultant force between the ends of said tubular sleeve, said piston including a bore therethrough extending from said outer piston surface and into said pressurizable air chamber, means forming an exhaust passageway in communication with said bore, means defining a valve seat in said bore, valving means for opening and closing said valve seat, said valve means including an operator with curved segments thereon located outwardly of said piston beyond said outer surface thereon, said outer surface curved segments being engageable with the curved portion of said rolling lobe of said sleeve as said sleeve lobe passes onto and off of said piston to move said operator inwardly of said valve bore to close said valve seat, said valve means being moved away from said seat by pressure thereon when said lobe is out of engagement with said operator to cause air to leak from said sleeve into said exhaust passageway means.

* * * * *